US012700126B2

(12) United States Patent
Flemmer et al.

(10) Patent No.: US 12,700,126 B2
(45) Date of Patent: Aug. 4, 2026

(54) VISION SYSTEM FOR AN ENERGY TRANSFER SYSTEM

(71) Applicant: Caterpillar Inc., Peoria, IL (US)

(72) Inventors: Mathew Flemmer, Christchurch (NZ);
Vaughan Weatherall, Dunedin (NZ)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 18/735,944

(22) Filed: Jun. 6, 2024

(65) Prior Publication Data

US 2025/0378568 A1     Dec. 11, 2025

(51) Int. Cl.
| | |
|---|---|
| *G06T 7/70* | (2017.01) |
| *B25J 11/00* | (2006.01) |
| *B25J 19/02* | (2006.01) |
| *H04N 13/243* | (2018.01) |

(52) U.S. Cl.
CPC .............. *G06T 7/70* (2017.01); *B25J 11/008* (2013.01); *B25J 19/023* (2013.01); *H04N 13/243* (2018.05); *G06T 2207/10012* (2013.01); *G06T 2207/10028* (2013.01)

(58) Field of Classification Search
CPC ....................................................... G06T 7/70
USPC ............................................................ 348/47
See application file for complete search history.

(56) References Cited

U.S. PATENT DOCUMENTS

| | | | |
|---|---|---|---|
| 6,816,755 | B2 | 11/2004 | Habibi et al. |
| 7,999,506 | B1 | 8/2011 | Hollar et al. |
| 9,056,555 | B1 | 6/2015 | Zhou |
| 9,493,087 | B2 | 11/2016 | Leary |
| 10,538,172 | B2 | 1/2020 | Kauffmann |
| 10,780,585 | B2 | 9/2020 | Park et al. |
| 10,850,633 | B2 | 12/2020 | Haddad et al. |
| 11,065,768 | B2 | 7/2021 | Patre et al. |

(Continued)

FOREIGN PATENT DOCUMENTS

| | | |
|---|---|---|
| CN | 107650711 A1 | 2/2018 |
| CN | 110797944 A | 2/2020 |

(Continued)

OTHER PUBLICATIONS

"Hyundai Motor Group Shows Newly Developed Automatic Chargin Robot for Electric Vehicles", Press Release, Mar. 21, 2023, 9 pages, https://www.hyundai.news/eu/articles/press-releases/newly-developed-automatic-charging-robot-for-electric-vehicles.html.

(Continued)

*Primary Examiner* — Amir Shahnami
(74) *Attorney, Agent, or Firm* — Harrity & Harrity LLP

(57) ABSTRACT

In some implementations, a system may detect that an energy transfer operation for a work machine is to be initiated. The system may obtain, via a first camera system, first image data associated with the work machine based on detecting that the energy transfer operation is to be initiated. The system may identify, based on the first image data, a first location of a receptacle access point on the work machine. The system may obtain, via a second camera system, second image data associated with the receptacle access point based on detecting that an end effector of a robotic system is in a ready position. The system may identify, based on the second image data, a second location associated with the receptacle access point. The system may perform, via the robotic system, an action based on the second location.

18 Claims, 9 Drawing Sheets

(56) References Cited

U.S. PATENT DOCUMENTS

| | | | |
|---|---|---|---|
| 11,077,557 | B2 | 8/2021 | Wallack et al. |
| 11,400,822 | B2 | 8/2022 | Krucinski et al. |
| 11,701,979 | B2 | 7/2023 | Svensson et al. |
| 2012/0233062 | A1 | 9/2012 | Cornish |
| 2013/0076902 | A1* | 3/2013 | Gao .......................... B25J 9/042 |
| | | | 348/148 |
| 2017/0008412 | A1* | 1/2017 | Wu .......................... B60L 53/65 |
| 2020/0009977 | A1 | 1/2020 | Park |
| 2021/0331597 | A1 | 10/2021 | Kamon et al. |
| 2022/0097544 | A1* | 3/2022 | Tanaami ................. B60L 53/16 |
| 2022/0219558 | A1* | 7/2022 | Vepari ................... B60L 53/305 |
| 2023/0056007 | A1 | 2/2023 | Wolter et al. |
| 2023/0106720 | A1 | 4/2023 | Othman et al. |
| 2023/0166613 | A1 | 6/2023 | Braunstein |
| 2023/0347769 | A1 | 11/2023 | Bailey |
| 2024/0051416 | A1 | 2/2024 | Hetrich |

FOREIGN PATENT DOCUMENTS

| | | |
|---|---|---|
| CN | 210391338 U | 4/2020 |
| CN | 111572373 A | 8/2020 |
| CN | 212796553 U | 3/2021 |
| CN | 113103899 A | 7/2021 |
| CN | 113442777 A | 9/2021 |
| CN | 115284248 A | 11/2022 |
| CN | 217804384 U | 11/2022 |
| CN | 115610250 A | 1/2023 |
| CN | 116001609 A | 4/2023 |
| CN | 219077050 U | 5/2023 |
| CN | 111071088 B | 8/2023 |
| CN | 116552282 A | 8/2023 |
| CN | 116811634 A | 9/2023 |
| CN | 117484525 A | 2/2024 |
| CN | 117764007 A | 3/2024 |
| DE | 102009006982 A1 | 8/2009 |
| DE | 102021130602 A1 | 5/2023 |
| DE | 102022121235 A1 | 2/2024 |
| DE | 102023003427 A1 | 3/2024 |
| EP | 3466747 A1 | 4/2019 |
| EP | 3654476 A2 | 5/2020 |
| JP | 2023088409 A | 6/2023 |
| KR | 102099759 B1 | 4/2020 |
| KR | 102207226 B1 | 1/2021 |
| KR | 20220095751 A | 7/2022 |
| KR | 102573464 B1 | 9/2023 |
| KR | 102625603 B1 | 1/2024 |
| WO | 03015220 A1 | 2/2003 |
| WO | 2024012688 A1 | 1/2024 |

OTHER PUBLICATIONS

Hope, Graham, "Hyundai Robot Can Charge Your Electric Vehicle", IOT World Today, Mar. 22, 2023, 9 pages, https://www.iotworldtoday.com/robotics/hyundai-robot-can-charge-your-electric-vehicle.

Written Opinion and International Search Report for Int'l. Patent Appln. No. PCT/US2025/031105, mailed Sep. 8, 2025 (18 pgs).

* cited by examiner

100

102

104

600

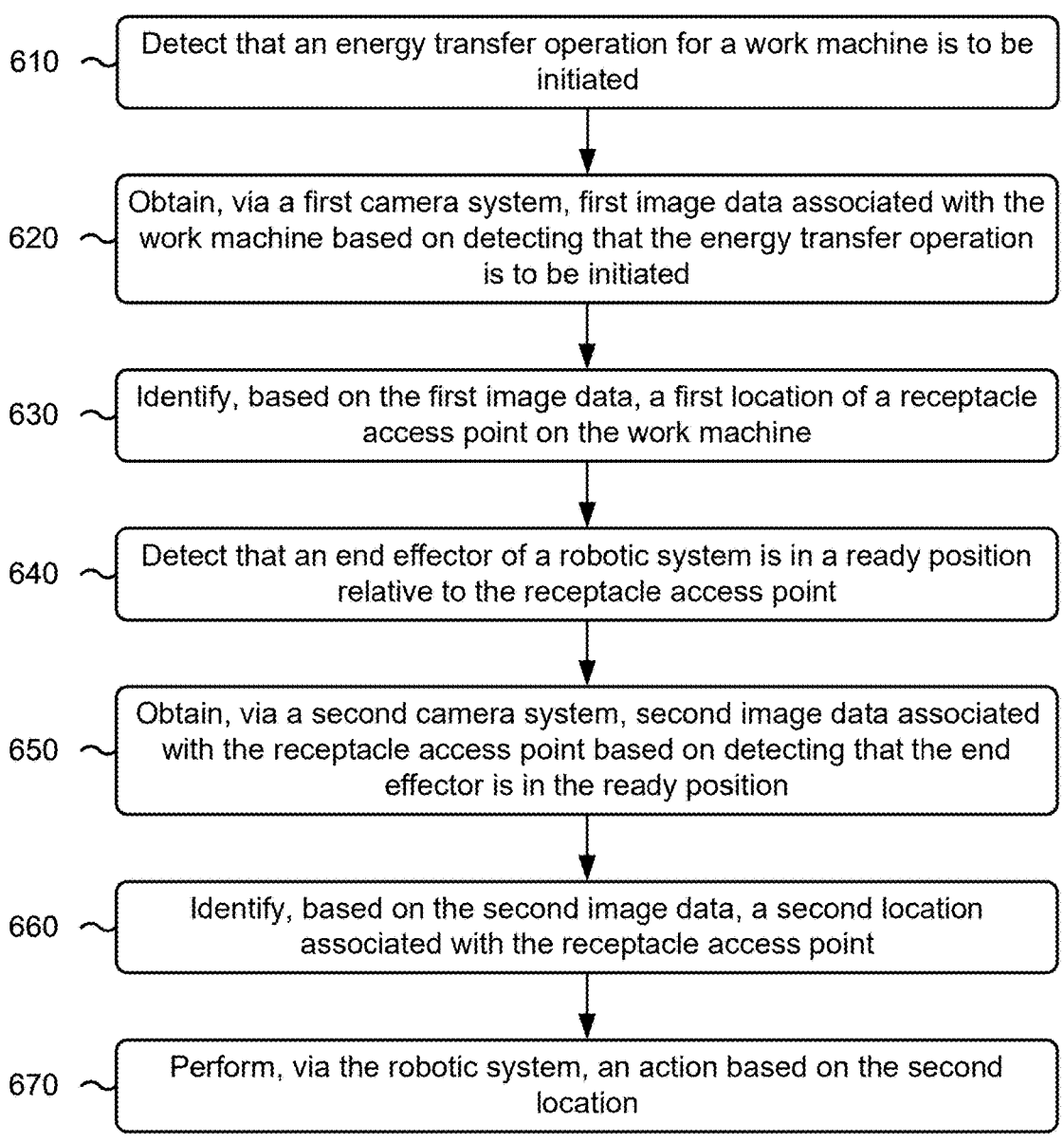

610 — Detect that an energy transfer operation for a work machine is to be initiated 620 — Obtain, via a first camera system, first image data associated with the work machine based on detecting that the energy transfer operation is to be initiated 630 — Identify, based on the first image data, a first location of a receptacle access point on the work machine 640 — Detect that an end effector of a robotic system is in a ready position relative to the receptacle access point 650 — Obtain, via a second camera system, second image data associated with the receptacle access point based on detecting that the end effector is in the ready position 660 — Identify, based on the second image data, a second location associated with the receptacle access point 670 — Perform, via the robotic system, an action based on the second location

FIG. 6

VISION SYSTEM FOR AN ENERGY TRANSFER SYSTEM

TECHNICAL FIELD

The present disclosure relates generally to an energy transfer system and, for example, to a vision system for an energy transfer system.

BACKGROUND

Machines (e.g., that utilizes another type of energy source other than fossil fuel, such as electricity, hydrogen, methanol, ammonia, or other sources of energy other than a fossil fuel), such as vehicles or other mobile machines, that are at least partially powered by on-board energy storage systems (e.g., batteries, hydrogen fuel cells, chemical storage components, among other examples) can be environmentally-friendly alternatives to machines powered by fossil fuels. However, in many cases, when a machine operates throughout the day, the on-board energy storage system needs to be replenished several times over the course of the day (e.g., at least five (5) times per day) to ensure that the machine has enough power to continuously operate. In some cases, a technician can connect one or more energy replenishing connectors to one or more receptacles of the machine (e.g., that are associated with an on-board energy storage system of the machine) to allow for the on-board energy storage system of the machine to be replenished. However, this manual process is subject to error (e.g., where a connector is not accurately inserted into a receptacle). This can result in a sub-optimal replenishment of the on-board energy storage system for the machine, such as in terms of an increased amount of time needed to replenish the energy for the machine and a decreased available energy level on-board the machine. Sub-optimal replenishment can impact operations of a machine, such as by reducing an amount of time that the machine is available to perform powered operations (e.g., as compared to an amount of time that the machine needs to be replenished with energy) and by reducing an amount of power that is available to perform the powered operations. Sub-optimal replenishment of the on-board energy storage system for the machine can, in some cases, also degrade the on-board energy storage system of the machine, which impacts a performance and/or an operable life of the on-board energy storage system, and of the machine.

Typically, automated and/or autonomous processes utilize image data to ensure precise functionality. Image data may be provided to a system as an input for one or more tasks, such as object detection, object recognition, and/or segmentation, among other examples, which may enable the system to perform one or more automated and/or autonomous operations. The image data may be captured via a camera system. The system may obtain camera data at various points throughout the one or more automated and/or autonomous operations (e.g., as components and/or objects in an environment move). This may decrease the efficiency of the one or more automated and/or autonomous operations because there may be a delay associated with capturing, obtaining, and/or analyzing the image data at the various points. Additionally, a machine may operate in environments associated with harsh conditions (e.g., extreme temperatures, high wind speeds, a large amount of debris, and/or other harsh conditions), such as a mine site and/or other work sites. As a result, an automated and/or autonomous processes for energy transfer to the machine in the manner described above (e.g., capturing, obtaining, and/or analyzing the image data at various points in an energy transfer operation) may increase the risk of damage to one or more components of the system due to the components operating in and/or being exposed to the harsh environment for more time.

China Patent No. CN117484525 ("the '525 patent") discloses a full-automatic charging service robot, which includes a movable intelligent platform, a multi-degree-of-freedom mechanical arm, an image monitoring device, an intelligent image sensor, and a charging gun head. The '525 patent discloses that the multi-degree-of-freedom mechanical arm can achieve a full-automatic charging operation of different electric automobiles. The '525 patent discloses that the image monitoring device collects image information of the electric vehicle to be charged in real time, and the image processor determines that the charging port is in a three-dimensional rectangular coordinate system based on the collected image information. Additionally, the '525 patent discloses that if the coordinates of the charging port in the three-dimensional rectangular coordinate system fall within the rechargeable coordinate range, the embedded controller controls the speaker of the human-computer interaction system to issue a prompt. The '525 patent discloses that the moving route and angle of the charging gun head are adjusted in real time through the data detected by the intelligent image sensor.

While the '525 patent discloses an image monitoring device collects image information of the electric vehicle to be charged in association with a full-automatic charging service robot, the '525 patent does not disclose providing any means to protect the full-automatic charging service robot and/or the image monitoring device (e.g., from environmental conditions) when not in use (e.g., when not charging an electric vehicle). This renders the full-automatic charging service robot disclosed by the '525 patent impractical for real-world applications, such as for providing energy transfer for machines that operate at a work site associated with an industry, such as mining or construction, with harsh environmental conditions.

The energy transfer system and/or the vision system of the present disclosure solves one or more of the problems set forth above and/or other problems in the art.

SUMMARY

An energy transfer system may include a robotic system that includes an end effector for coupling with receptacles for energy transfer; a first camera system; a second camera system; and one or more controllers configured to: detect that an energy transfer operation for a work machine is to be initiated; obtain, via the first camera system and based on detecting that the energy transfer operation is to be initiated, first image data associated with the work machine; identify, based on the first image data, a first location of a receptacle access point on the work machine; detect that the end effector is in a ready position relative to the receptacle access point; obtain, via the second camera system and based on detecting that the end effector is in the ready position, second image data associated with the receptacle access point; identify, based on the second image data, a second location of one or more receptacles included in the receptacle access point; and perform, via the robotic system and based on the second location, an action associated with enabling a coupling between the end effector and the one or more receptacles.

A method may include detecting, by a device, that an energy transfer operation for a work machine is to be initiated; obtaining, by the device and via a first camera system, first image data associated with the work machine based on detecting that the energy transfer operation is to be initiated; identifying, by the device and based on the first image data, a first location of a receptacle access point on the work machine; detecting, by the device, that an end effector of a robotic system is in a ready position relative to the receptacle access point; obtaining, by the device and via a second camera system, second image data associated with the receptacle access point based on detecting that the end effector is in the ready position; identifying, by the device and based on the second image data, a second location associated with the receptacle access point; and performing, by the device and via the robotic system, an action based on the second location.

A vision system of an energy transfer system may include a first camera system having a first field of view, the first camera system being configured to: obtain first image data indicative of receptacle access point locations for energy transfer; and a second camera system having a second field of view, the second camera system being coupled to a robotic system of the energy transfer system, and the second camera system being configured to: obtain second image data indicative of receptacle locations, the second image data being associated with coupling an end effector of the robotic system with one or more receptors for the energy transfer.

BRIEF DESCRIPTION OF THE DRAWINGS

FIG. 6 is a flowchart of an example process associated with a vision system for an energy transfer system.

DETAILED DESCRIPTION

This disclosure relates to an energy transfer system that is configured to enable an energy transfer to a work machine, which is applicable to any work machine that is at least partially powered by a non-fossil-fuel-based energy storage system (e.g., energy other than fossil-fuel-based energy), such as a battery system. The work machine may be any type of machine configured to perform operations associated with an industry such as mining, construction, farming, transportation, or any other industry. Although some examples are described herein in associated with electrical energy transfer, the techniques, implementations, systems, devices, and/or components described herein may be similarly applicable for other types of energy transfer, such as hydrogen transfer, biofuel transfer, and/or gas transfer (e.g., propane, liquefied petroleum gas, compressed natural gas, liquefied natural gas, or other types of gas), among other examples.

Figure 1:
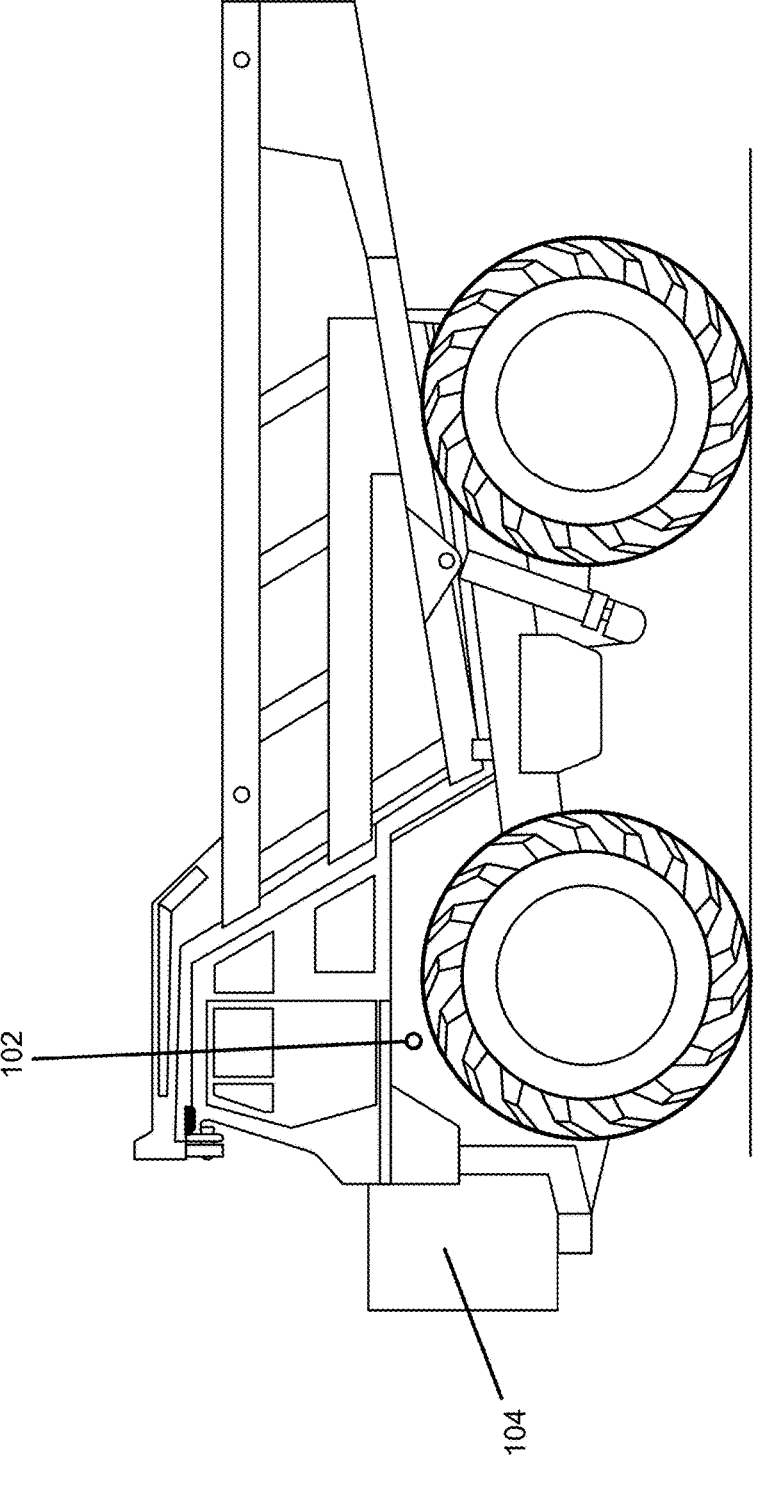
FIG. 1 is a diagram of an example work machine described herein.

FIG. 1 is a diagram (e.g., a side-view) of an example work machine 100 described herein. The work machine 100 may be a mobile machine or vehicle, and may include a dump truck, a wheel loader, a hydraulic excavator, or another type of machine. Further, the work machine 100 may be a manned machine or an unmanned machine. The work machine 100 may be fully-autonomous, semi-autonomous, or remotely operated. As further shown in FIG. 1, the work machine 100 may include an energy storage system 102 (e.g., included within a chassis of the work machine 100) and a receptacle access point 104.

The work machine 100 may be configured to be at least partially powered by the energy storage system 102. That is, the work machine 100 may be a machine that utilizes electricity, hydrogen, methanol, ammonia, and/or other sources of energy other than a fossil fuel. As an example, the energy storage system 102 may include one or more batteries that store energy to be used to power one or more components of the work machine 100. For example, the work machine 100 may be a battery electric machine (BEM), a battery electric vehicle (BEV), a hybrid vehicle, a fuel cell and battery hybrid vehicle, or another machine that is at least partially powered by the energy storage system 102. The work machine 100 may include one or more electric engines, one or more electric motors, one or more electrical conversion systems, and/or other electrical components that are configured to convert and/or use energy, such as energy stored in the energy storage system 102, to cause overall movement of the work machine 100 across a work site and/or to cause movement of individual components or systems of the work machine 100.

The energy storage system 102 may include one or more batteries, such as one or more lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, the energy storage system 102 may include one or more battery packs, one or more battery strings, one or more battery modules, and/or one or more battery cells.

When the energy storage system 102 stores hydrogen, the energy storage system 102 may include one or more hydrogen fuel cells. A hydrogen fuel cell may store hydrogen in compressed gas form or in a liquid state. When the energy storage system 102 stores methanol, ammonia, or another type of alternative fuel (e.g., other than a fossil fuel, electricity, or hydrogen), the energy storage system 102 may include one or more chemical storage components, which may include tanks, containers, other types of chemical storage components.

The receptacle access point 104 provides an energy transfer interface (e.g., a wired energy transfer interface) for the energy storage system 102 and/or another fuel or energy storage of the work machine 100. For example, the receptacle access point 104 provides an energy transfer interface that can be physically connected to an energy transfer system (e.g., the energy transfer system 300 described herein) to allow an energy transfer from the energy transfer system to the energy storage system 102 (or vice versa) or other fuel or energy storage. The receptacle access point 104 may be located on a front of the work machine 100 (as shown), a side of the work machine 100, a back of the work machine 100, a bottom of the work machine 100, a top of the work machine 100, or at any other position on the work machine 100. The receptacle access point 104 is further described herein.

As indicated above, FIG. 1 is provided as an example. Other examples may differ from what is described in connection with FIG. 1.

Figure 2A:
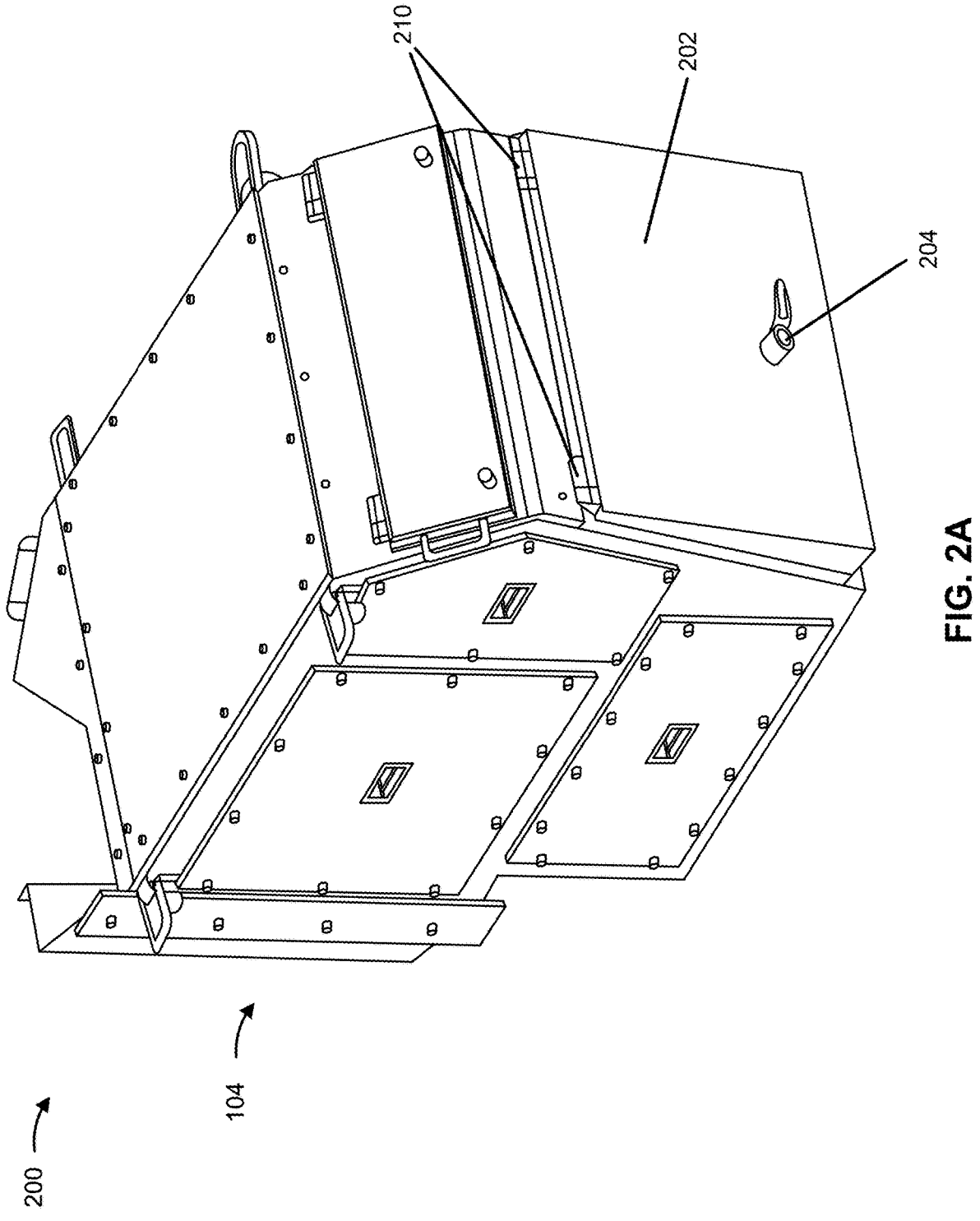
FIGS. 2A-2B are diagrams of examples of the receptacle access point described herein.
Figure 2B:
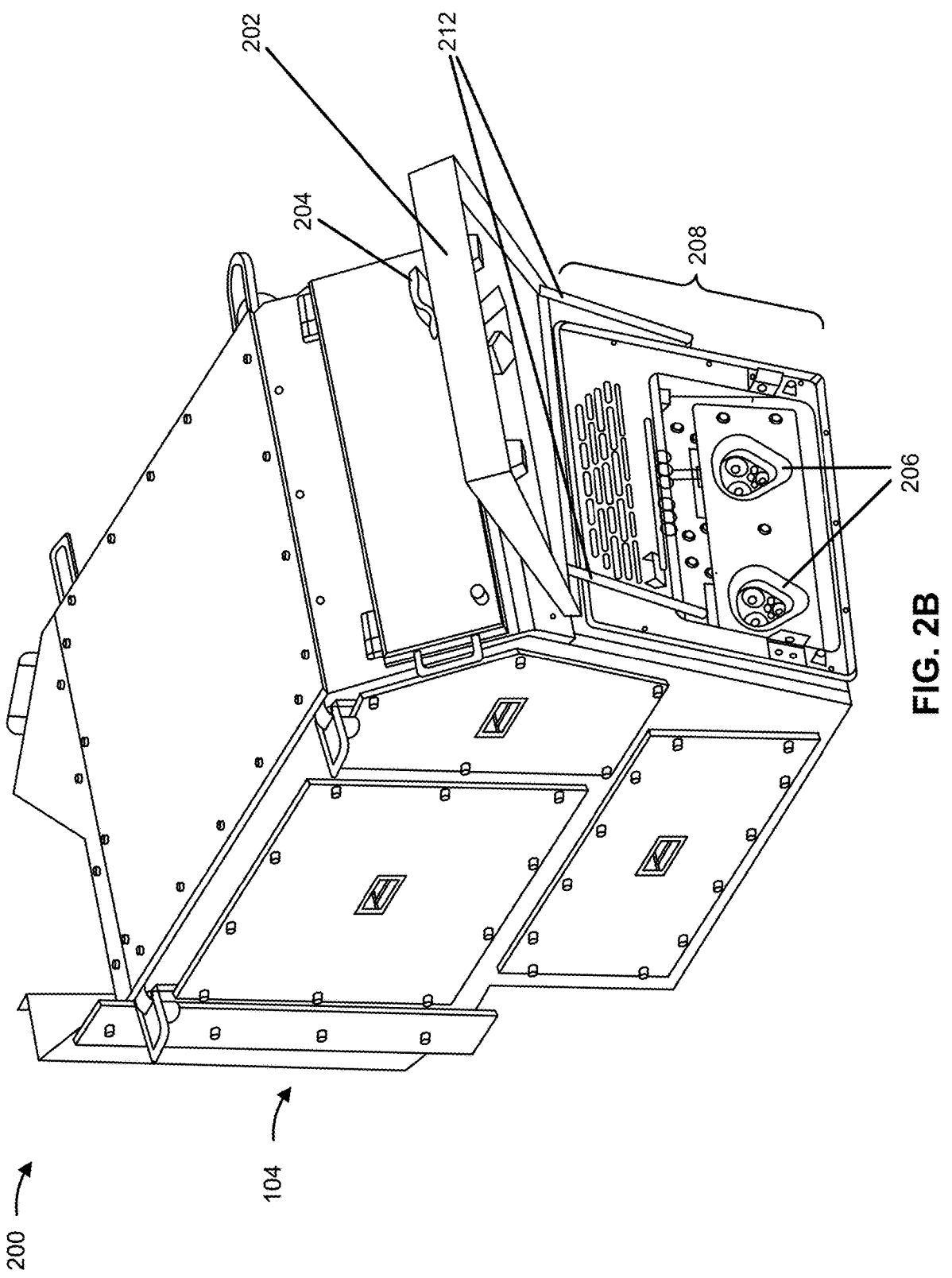

FIGS. 2A-2B are diagrams (e.g., front-angled views) of examples 200 of the receptacle access point 104 described herein. As shown in FIGS. 2A-2B, the receptacle access point 104 includes an access door 202, an access mechanism 204, and one or more receptacles 206. FIG. 2A shows the receptacle access point 104 in a closed state (e.g., when the access door 202 is in a closed position), and FIG. 2B shows the receptacle access point 104 in an open state (e.g., when the access door 202 is in an open position).

For example, when the access door 202 is in the closed position (e.g., such that edges of the access door 202 cover a flange of the interior panel 208) the access door 202 may prevent dirt, rocks, construction debris, waste matter, moisture, or other material (e.g., present at a work site at which the work machine 100 is operating) from accessing the interior panel 208. The access door 202 is moveable. For example, the access door 202 may be moved from the closed position (e.g., shown in FIG. 2A) to the open position (e.g., shown in FIG. 2B), such as by causing the access door 202 to pivot on one or more hinges 210. The receptacle access point 104 may include one or more support components 212 (e.g., one or more stays, one or more pistons, and/or one or more pneumatic cylinders, among other examples) that facilitate opening of the access door 202 (e.g., that facilitate movement of the access door 202 from the closed position to the open position) and/or that facilitate the access door 202 remaining in the open position (e.g., by resisting any force exerted on the access door 202 that is less than a force threshold that is associated with closing the access door 202, as further described herein).

The access mechanism 204 is configured to be manipulatable to cause the access mechanism 204 to be engaged (e.g., to change from disengaged to engaged) or to be disengaged (e.g., to change from engaged to disengaged). For example, the access mechanism 204 may be configured to be rotated, slid, pushed, pulled, lifted, extended, and/or retracted, among other examples, to cause the access mechanism 204 to be engaged or disengaged. Accordingly, the access mechanism 204 may include a latch, a bolt, a catch, a hook, a hasp, and/or a fastener, among other examples. The access mechanism 204 may include a portion, such as a latch portion, upon which a force can be applied to cause the access mechanism 204 to disengage (or, alternatively, to engage).

As shown in FIG. 2B, the one or more receptacles 206 may be included on the interior panel 208 of the receptacle access point 104. Each of the one or more receptacles 206 may be any type of physical component for coupling with a plug of an energy transfer system (e.g., a plug 402 of the energy transfer system 300 described herein) to enable an energy transfer from the energy transfer device to the energy storage system 102 (or vice versa). While the term "receptacles" are used herein, the one or more receptacles 206 may include plugs, ports, connectors, or any other type of wired energy transfer component.

As indicated above, FIGS. 2A-2B are provided as an example. Other examples may differ from what is described in connection with FIGS. 2A-2B.

Figure 3A:
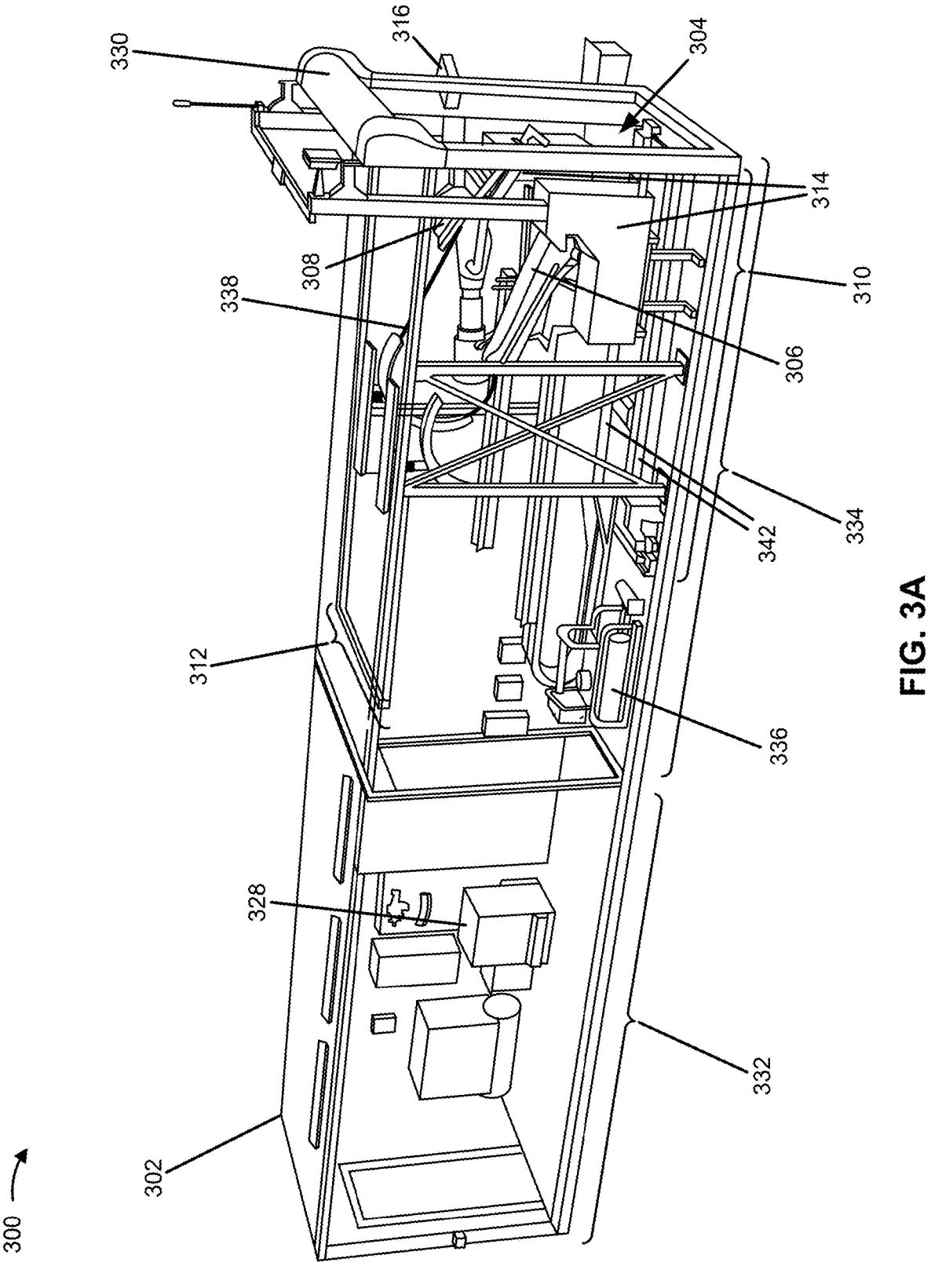
FIGS. 3A-3B are diagrams of an example energy transfer system.
Figure 3B:
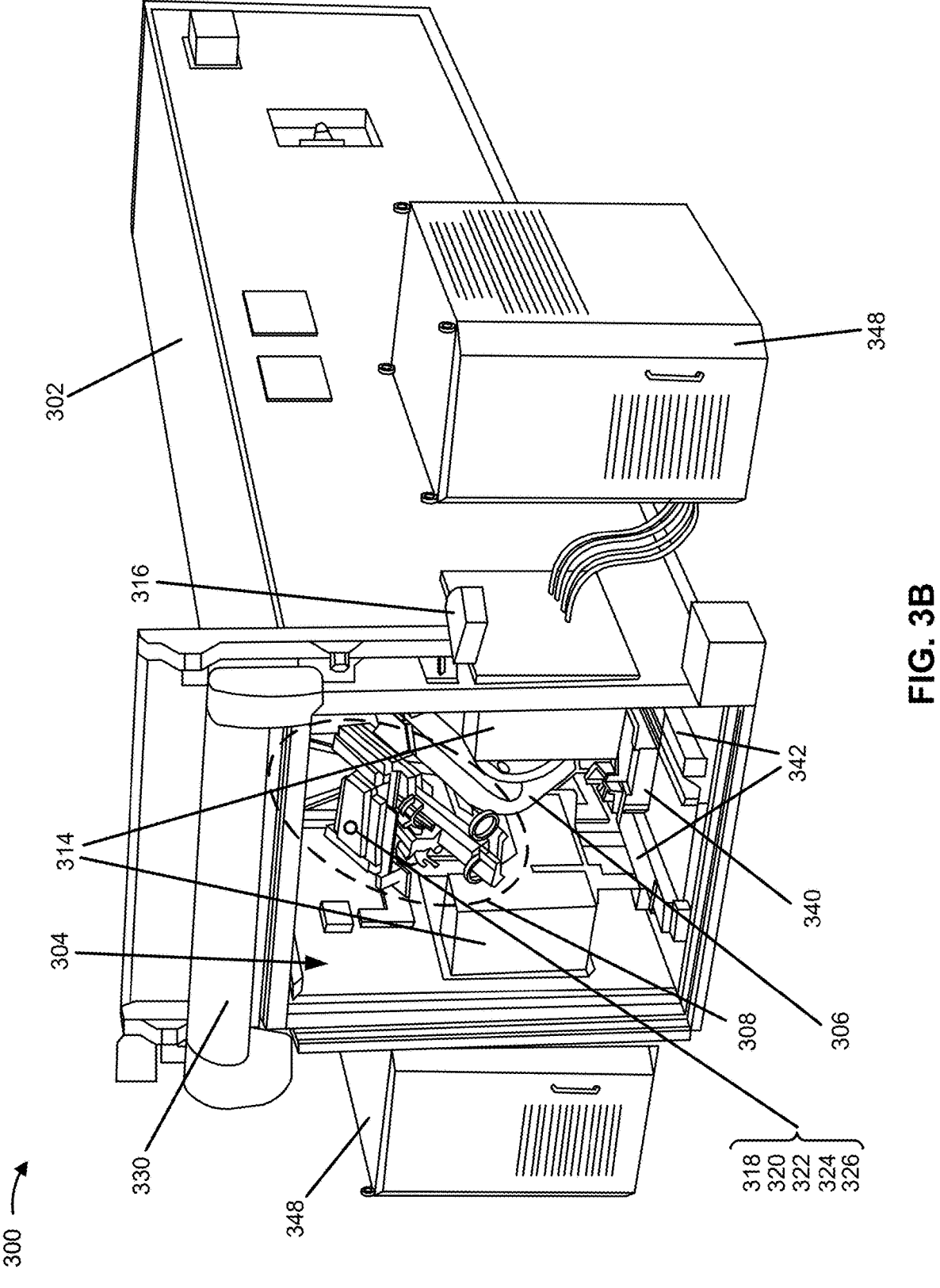

FIGS. 3A-3B are diagrams of an example energy transfer system 300. The energy transfer system 300 is configured to enable an energy transfer to and/or from the work machine 100 (e.g., to and/or from the energy storage system 102 of the work machine 100). In some implementations, the energy transfer system 300 is configured to autonomously enable the energy transfer (e.g., as further described herein), such as without any interaction with a human technician. However, other implementations include a human technician interacting with the energy transfer system 300 and, thus, the term "energy transfer system" includes any energy transfer system that is at least semi-autonomous (e.g., includes at least one autonomously controlled or operated system or component). FIG. 3A shows a side (cut-away) view of the energy transfer system 300, and FIG. 3B shows a front-angled view of the energy transfer system 300.

As shown in FIGS. 3A-3B, the energy transfer system 300 may include a housing 302 that includes a portal 304 at an end of the housing; a robotic system 306 that includes an end effector 308; a slide system 310; a cable management system 312; an energy transfer outlet system 314; a first camera system 316; a second camera system 318; a door opening system 320; a connector retention system 322; a connector protection system 324; a door closing system 326; and/or one or more controllers 328.

The housing 302 includes a metal, or other hard and/or weather resistant material, and may have a rectangular prism shape and/or other shapes. The housing 302 may include the portal 304 at an end of the housing 302 (e.g., instead of one of the short sides of the housing 302). The energy transfer system 300 may include an housing door 330 that is configured to cover the portal 304 when closed, and to uncover the portal 304 when open. For example, the housing door 330 may be a retractable door. The housing door 330, when closed, may protect an interior of the housing 302, such by preventing dirt, rocks, construction debris, waste matter, moisture, or other material (e.g., present at a work site at which the work machine 100 is operating) from accessing interior of the housing 302.

As shown in FIG. 3A, the interior of the housing 302 may be divided into a first interior portion 332 of the housing 302 and a second interior portion 334 of the housing 302 (e.g., that is separated by a wall, a door, or another separator). The first interior portion 332 of the housing 302 may include the one or more controllers 328 and/or one or more other electrical components, one or more pneumatic components, and/or one or more other communication components, among other examples, that enable operation of the systems and components included in the second interior portion 334 of the housing 302.

The second interior portion 334 of the housing 302 may include the slide system 310, the cable management system 312, and the energy transfer outlet system 314. The second interior portion 334 may also include additional systems and/or components for enabling operation of the robotic system 306 and/or an energy transfer operation, such as a pressure washer system 336 and one or more energy transfer cables 338 (e.g., that are configured to transmit energy to and/or from one or more plugs of the end effector 308, such as the one or more plugs 402 described herein). As shown in FIG. 3A, the second interior portion 334 may be associated with the end of the housing 302 that includes the portal 304. The slide system 310 is configured to move the robotic system 306, via the portal 304 of the housing 302, between an interior of the housing 302 (e.g., the second interior portion 334 of the housing 302) and an external environment (e.g., that surrounds the housing 302, such as at a work site). The slide system 310 may include a mount 340 for connecting to the robotic system 306 (e.g., for holding the robotic system 306 as the robotic system is moved by the slide system 310) and a slide apparatus 342 for moving the robotic system 306. For example, when the housing door 330 is open, the slide apparatus 342 may be configured to slide the robotic system 306 from the second interior portion 334 of the housing 302 to the external environment (e.g., to allow the robotic system 306 have uninhibited movement to enable an energy transfer operation) and to slide the robotic system 306 from the external environment to the second interior portion 334 (e.g., to allow the robotic system 306, when not enabling an energy transfer operation, to be protected from environmental conditions associated with the external environment).

The energy transfer outlet system 314 is configured for enabling connection between the one or more energy transfer cables 338 and an external transfer dispenser system 348 (e.g., that is not included in the autonomous energy transfer system 300). The external transfer dispenser system 348 may be, for example, configured as a high-capacity external transfer dispenser system that transmits and distributes electrical power at a scale of millions of watts (megawatts). Accordingly, the external transfer dispenser system 348 may provide energy to the one or more energy transfer cables 338, and thus to plugs of the end effector (e.g., the plugs 402 described herein) via the energy transfer outlet system 314.

As shown in FIGS. 3A-3B, the first camera system 316 may be mounted on an exterior (e.g., an exterior side) of the housing 302. The first camera system 316 is configured to obtain first image data associated with the receptacle access point 104 (e.g., when mounted on the work machine 100), among other examples described in more detail herein. For example, the first camera system 316 may obtain the first image data to allow the one or more controllers 328 to determine whether the receptacle access point 104 is within an engagement range of the robotic system 306 (e.g., when the robotic system 306 is moved to the external environment by the slide system 310), such as to allow the robotic system 306 to interact with the receptacle access point 104 to initiate an energy transfer operation. The first camera system 316 may include one or more cameras or other image capturing devices. The first camera system 316 may be a stereo camera system, a three-dimensional (3D) camera system, a light detection and ranging (LiDAR) camera system, a non-visible light camera system (e.g., an infrared camera system), and/or another type of camera system. For example, the first camera system 316 may include two or more cameras arranged and/or configured to simulate or mimic binocular vision. For example, the two or more cameras may be configured to capture image data from different perspectives, enabling depth perception and the creation of 3D images or videos. The first camera system 316 may be configured within a container (e.g., a housing) mounted to the housing 302.

The robotic system includes the end effector 308, which may include (e.g., mounted to the end effector 308) the second camera system 318, the door opening system 320, the connector retention system 322, the connector protection system 324, and/or the door closing system 326. The second camera system 318, the door opening system 320, the connector retention system 322, the connector protection system 324, and/or the door closing system 326 are shown in m detail in FIG. 4.

The second camera system 318 is configured to obtain second image data associated with the access mechanism 204 of the receptacle access point 104 and/or of the one or more receptacles 206. For example, the second camera system 318 may obtain the second image data to allow the one or more controllers 328 to identify a location of the access mechanism 204 of the receptacle access point 104, such as to allow the door opening system 320 to open the access door 202 of the receptacle access point 104 (e.g., as further described herein). Further, the second camera system 318 is configured to obtain third image data associated with the one or more receptacles 206 included in the receptacle access point 104. For example, the second camera system 318 may obtain the third image data to allow the one or more controllers 328 to identify a location of the one or more receptacles 206, such as to enable one or more plugs of the end effector 308 (e.g., the one or more plugs 402 of the end effector 308 further described herein) to couple to the one or more receptacles 206 (e.g., as further described herein) and thereby enable the energy transfer operation. The second camera system 318 may be a stereo camera system, a 3D camera system, a LiDAR camera system, a non-visible light camera system (e.g., an infrared camera system), and/or another type of camera system. For example, the second camera system 318 may include two or more cameras arranged and/or configured to simulate or mimic binocular vision. For example, the two or more cameras may be configured to capture image data from different perspectives, enabling depth perception and the creation of 3D images or videos.

The door opening system 320 is configured to open the access door 202 of the receptacle access point 104 (e.g., based on the location of the access mechanism 204 of the receptacle access point 104 identified by the one or more controllers 328). The door opening system 320 may include a manipulation system (e.g., the manipulation system 404 described herein in relation to FIG. 4) for manipulating the access mechanism 204 of the receptacle access point 104 to allow the access door 202 to open.

As indicated above, FIGS. 3A-3B are provided as an example. Other examples may differ from what is described in connection with FIGS. 3A-3B.

Figure 4:
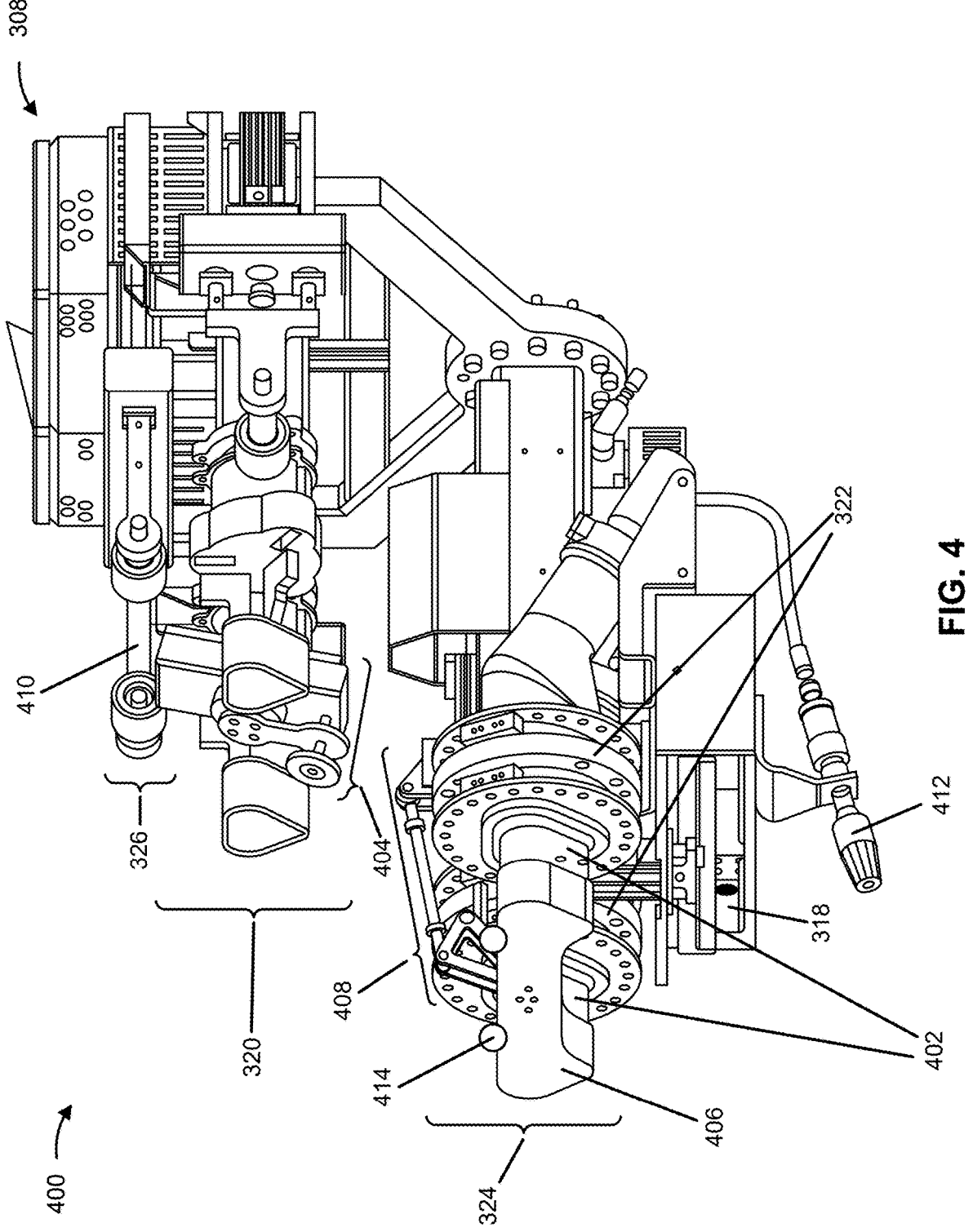
FIG. 4 is a diagram of an example of the end effector of the robotic system described herein.

FIG. 4 is a diagram (e.g., front-angled views) of an example 400 of the end effector 308 of the robotic system 306 described herein. FIG. 4 shows a front-angled view of the end effector 308.

As shown in FIG. 4, the end effector 308 includes one or more plugs 402. Each of the one or more plugs 402 may be any type of physical component for coupling with a corresponding receptacle 206 of the receptacle access point 104 to enable an energy transfer from the energy transfer system 300 to the work machine 100 (e.g., to the energy storage system 102 of the work machine 100) (or vice versa). While the term "plugs" are used herein, the one or more plugs 402 may include receptacles, ports, connectors, or any other type of wired electrical transfer component.

As further shown in FIG. 4, the end effector 308 may include (e.g., mounted to the end effector 308) the second camera system 318, the door opening system 320, the connector retention system 322, the connector protection system 324, and/or the door closing system 326. For example, as shown in FIG. 4, the second camera system 318 may be positioned at a bottom of the end effector 308, the one or more plugs 402 may be positioned above the second camera system 318 (and the connector retention system 322 and the connector protection system 324 may be positioned in line with the one or more plugs 402), the door opening system 320 may be positioned above the one or more plugs 402, and the door closing system 326 may be positioned above the door opening system 320.

As shown in FIG. 4, the door opening system 320 may include a manipulation system 404 for manipulating the access mechanism 204 of the receptacle access point 104 to allow the access door 202 of the receptacle access point 104 to open (e.g., when the receptacle access point 104 is within an engagement range of the robotic system 306).

The connector protection system 324 may include a cap 406 for covering the one or more plugs 402 when the one or more plugs 402 are not coupled to the one or more receptacles 206 of the receptacle access point 104 (e.g., when an energy transfer operation is not occurring). Additionally, the connector protection system 324 may include a cap adjustment system 408 for removing the cap 406 when the one or more plugs 402 are to couple to the one or more receptacles 206 and for re-placing the cap 406 when the one or more plugs 402 are to uncouple from the one or more receptacles 206.

The door closing system 326 may include an interaction system 410 for interacting with the access door 202 to allow the access door 202 to close (e.g., when the receptacle access point 104 is within an engagement range of the robotic system 306).

As further shown in FIG. 4, the end effector 308 may include one or more water nozzles 412 and/or one or more air nozzles 414. The one or more water nozzles 412 are configured to provide one or more streams of water to clean an exterior of the receptacle access point 104, such as to clean the access door 202 of the receptacle access point 104 (e.g., prior to the door opening system 320 opening the access door 202).

As indicated above, FIG. 4 is provided as an example. Other examples may differ from what is described in connection with FIG. 4.

Figure 5A:
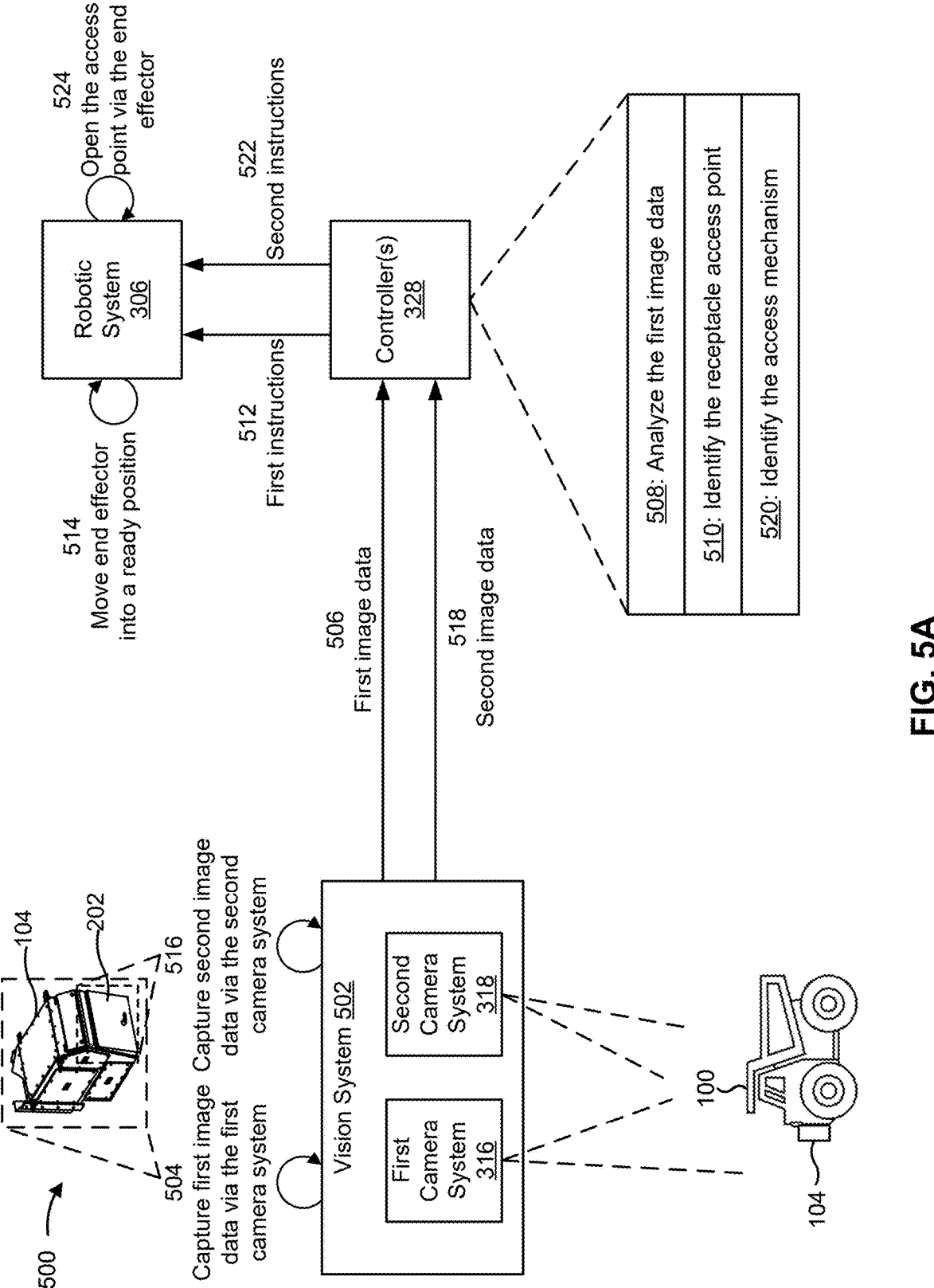
FIGS. 5A-5B are diagrams of an example of a vision system for the energy transfer system described herein.
Figure 5B:
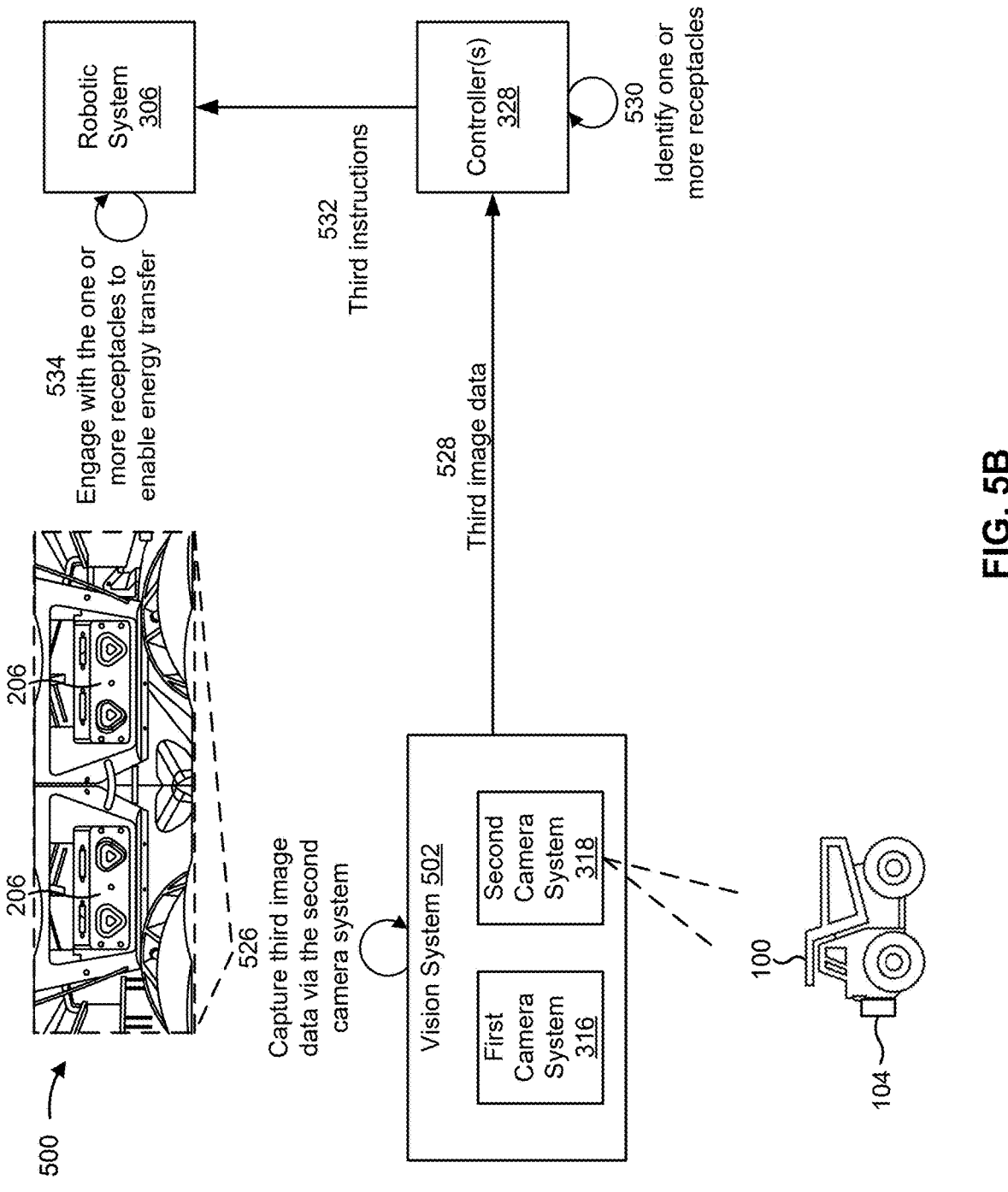

FIGS. 5A-5B are diagrams of an example 500 of a vision system 502 for the energy transfer system 300 described herein. The vision system 502 may include the first camera system 316 and the second camera system 318. The vision system 502 may be configured to obtain image data for the energy transfer system 300. The energy transfer system 300 (e.g., the one or more controllers 328) may use and/or analyze the image data to enable efficient operation of the robotic system 306 and/or to reduce a likelihood of damaging one or more components of the energy transfer system 300 during an energy transfer operation (e.g., may improve the safety of the energy transfer operation), among other examples as described in more detail elsewhere herein.

The first camera system 316 has a first field of view and the second camera system 318 has a second field of view. The first field of view is larger than the second field of view. For example, the first camera system 316 is configured to capture a larger or wider field of view than the second camera system 318. In other words, the first camera system 316 may be a far view or far-find camera system and the second camera system 318 may be a near view or near-find camera system.

As shown in FIG. 5A, and by reference number 504, the vision system 502 captures and/or obtains first image data via the first camera system 316. For example, the first camera system 316 may periodically capture image data. Additionally, or alternatively, the first camera system 316 may capture image data based on, or in response to, an event. The event may include obtaining instructions to capture the image data from the one or more controllers 328. As another example, the event may include the work machine 100 being in a position (e.g., relative to the energy transfer system 300) that is associated with initiating the energy transfer operation.

For example, the vision system 502 and/or the one or more controllers 328 may detect that an energy transfer operation for a work machine is to be initiated. The vision system 502 and/or the one or more controllers 328 may detect that the work machine 100 is located in a position relative to the energy transfer system 300 that is associated with initiating the energy transfer operation. As another example, the vision system 502 and/or the one or more controllers 328 may obtain information from the work machine 100 that is indicative of initiating the energy transfer operation. For example, the work machine may provide one or more wireless communications (such as radio frequency identification (RFID) communications, Bluetooth communications, local area network communications, Wi-Fi communications, or another type of wireless communication) that include the information that is indicative of initiating the energy transfer operation. The information may identify the work machine 100 and/or indicate that the energy transfer operation is to be initiated.

The one or more controllers 328 and/or the vision system 502 may use the information to initialize the first camera system 316 in association with capturing the first image data. For example, the one or more controllers 328 and/or the vision system 502 may determine a relative location of the receptacle access point 104 of the work machine 100. This enables the first camera system 316 to capture image data in the relative location (e.g., rather than capturing and/or processing a larger amount of image data to enable the one or more controllers 328 to identify the location of the receptacle access point 104). This improves the efficiency of detecting and/or identifying the location of the receptacle access point 104.

The first camera system 316 may capture and/or obtain the first image data while the robotic system 306 is inside of the housing 302. For example, the first camera system 316 may capture and/or obtain the first image data while the housing door 330 of the portal 304 is closed. The first image data may indicate evaluation information to be used by the one or more controllers 328 to evaluate the state and/or readiness of the energy transfer operation before causing the robotic system 306 to move to the external environment (e.g., external to the housing 302). This reduces a likelihood of damage to one or more components of the robotic system 306 because the amount of time that the robotic system 306 is operating in the external environment (e.g., that may have harsh conditions) is reduced and/or the robotic system 306 may not exit the housing 302 until the one or more controllers 328 have determined that the external environment is safe (e.g., that are no unexpected objects or obstacles in the area in which the robotic system 306 will operate) and that the work machine 100 (e.g., the receptacle access point 104) is in a position to enable the energy transfer operation to be performed. This improves the efficiency of the energy transfer operation.

As shown by reference number 506, the vision system 502 (e.g., the first camera system 316) may provide or transmit, and the one or more controllers 328 may obtain or receive, the first image data. The first image data may depict the work machine 100 and/or the receptacle access point 104 in the external environment. The first image data may be, or may include, point cloud data. For example, the point cloud data may include a collection of points in a 3D space representing the surfaces of one or more objects in the external environment. The first camera system 316 may capture two or more images (e.g., from different perspectives) to enable depth perception through triangulation (e.g., the first camera system 316 and/or the one or more controllers 328 compare disparities between corresponding points in image pairs to calculate the distance to each point, constructing a detailed 3D representation of the external environment via the point cloud data). The point cloud data of the first image data may have a first density (e.g., a first density of points included in the point cloud data). For example, the first image data may include point cloud data representative or indicative of receptacle access point location(s) for the work machine 100.

As shown by reference number 508, the one or more controllers 328 may analyze the first image data. In some examples, the one or more controllers 328 may generate the point cloud data described above using the first image data. For example, the one or more controllers 328 may perform a computer vision operation to analyze the first image data. The one or more controllers 328 may identify one or more objects depicted via the first image data, such as the work machine 100 and/or the receptacle access point 104. In some examples, the one or more controllers 328 may determine whether any unexpected objects or structures are depicted in the first image data (e.g., which may interfere with the operation of the robotic system 306 in the external environment).

As shown by reference number 510, the one or more controllers may identify the receptacle access point 104 of the work machine 100. For example, the one or more controllers 328 identify, based on the first image data, a location of a receptacle access point on the work machine. The one or more controllers 328 may perform one or more image analysis operations, such as feature extraction, matching, and/or geometric reasoning, among other examples to identify the receptacle access point 104 based on distinct characteristics, such as shape, texture, and/or color, among other examples, of the receptacle access point 104. By using the first image data (e.g., the point cloud data), the one or more controllers 328 may determine a position and/or orientation of the receptacle access point 104. This improves the efficiency of the energy transfer operation. For example, even if the work machine 100 is in the correct position relative to the energy transfer system 300 to perform the energy transfer operation, the external environment may include uneven and/or varying terrain which may cause the receptacle access point 104 to be at different orientations relative to the energy transfer system 300. By determining the position and/or orientation of the receptacle access point 104 using the first image data, the one or more controllers 328 can detect these variations in orientation and instruct the robotic system 306 on the actual position and/or orientation of the receptacle access point 104 before the robotic system 306 begins operation and/or before the robotic system 306 moves to the external environment.

As shown by reference number 512, the one or more controllers 328 provides, and the robotic system obtains, first instructions. The first instructions may indicate the position and/or orientation of the receptacle access point 104 (e.g., as determined via the first image data). The first instructions may be provided to a guidance system of the robotic system 306. The first instructions may enable the robotic system 306 to move to a position near the receptacle access point 104. For example, the one or more controllers 328 may provide receptacle access point locations to the guidance system of the robotic system 306.

As shown by reference number 514, the robotic system 306 may move the end effector 308 into a ready position based on the first instructions. The ready position is associated with a distance between the end effector 308 and the receptacle access point 104 satisfying a threshold (e.g., the ready position may be a position near or close to the receptacle access point 104). In some examples, the robotic system 306 may perform one or more operations prior to being in the ready position, such as a cleaning operation to clean the receptacle access point 104. The one or more controllers 328 and/or the vision system 502 may detect that the end effector 308 is in the ready position (e.g., based on information obtained via the robotic system 306). Additionally, or alternatively, one or more controllers 328 and/or the vision system 502 may detect that the end effector 308 has completed the cleaning operation to clean the receptacle access point 104. Waiting to capture image data via the second camera system 318 until the end effector 308 has completed the cleaning operation improve the quality of image data captured by the second camera system 318, described in more detail herein.

As shown by reference number 516, the vision system 502 may capture and/or obtain second image data via the second camera system 318. For example, the vision system 502 and/or the second camera system 318 may capture or obtain, based on detecting that the end effector 308 is in the ready position, the second image data associated with the receptacle access point 104. The second camera system 318 may capture or obtain the second image data while the robotic system 306 is outside of the housing 302 (e.g., in the external environment near the receptacle access point 104). The second image data may be associated with the access mechanism 204 of the receptacle access point 104. The second image data may depict the access mechanism 204.

The second image data may include point cloud data, in a similar manner as described above. The point cloud data of the second image data may have a second density. The second density may be greater than the first density of the point cloud data of the first image data, described elsewhere herein. For example, the point cloud data of the second image data may be denser point cloud data than the point cloud data obtained via the first image data. This enables more accurate position and/or orientation determination by the one or more controllers 328 for the access mechanism 204.

As shown by reference number 518, the vision system 502 (e.g., the second camera system 318) may provide or transmit, and the one or more controllers 328 may obtain or receive, the second image data. As shown by reference number 520, the one or more controllers 328 may identify the access mechanism 204 using the second image data. The one or more controllers 328 identify, based on the second image data, a location and/or orientation of the access mechanism 204.

As shown by reference number 522, the one or more controllers 328 may provide, and the robotic system 306 may obtain, second instructions. The second instructions may indicate the location and/or orientation of the access mechanism 204. The second instructions may enable the robotic system 306 to engage with and/or open the access door 202 of the receptacle access point 104 via the access mechanism 204.

As shown by reference number 524, the robotic system 306 may open the receptacle access point 104 (e.g., may open the access door 202) via the end effector 308 using the second instructions. For example, the robotic system 306 may cause, using the location and/or orientation of the access mechanism 204 as determined using the second image data, the end effector 308 to engage the access mechanism 204 to access the receptacle access point 104 (e.g., to open, unlock, unlatch, and/or otherwise access the access door 202).

As shown in FIG. 5B, and by reference number 526, the vision system 502 captures and/or obtains third image data via the second camera system 318. The third image data is associated with (e.g., may depict) the one or more receptacles 206. For example, after the access door 202 is opened via the end effector 308, the second camera system 318 may capture and/or obtain image data associated with (e.g., depicting) the one or more receptacles 206 (e.g., because the one or more receptacles 206 are now exposed after the access door 202 is opened).

For example, the vision system 502 and/or the one or more controllers 328 may detect that the robotic system 306 has accessed the receptacle access point 104 via the access mechanism 204 (e.g., to open or otherwise access the access door 202). The vision system 502 may obtain, via the second camera system 318, the second image data based on the robotic system 306 accessing the receptacle access point 104. In a similar manner as described elsewhere herein, the second camera system 318 may capture and/or obtain the third image data while the robotic system 306 is outside of the housing 302. In some examples, the vision system 502 and/or the one or more controllers 328 may cause the second camera system 318 to capture or obtain the third image data based on detecting that a cleaning operation for the interior of the receptacle access point 104 has been performed (e.g., via the end effector 308). For example, the robotic system 306 may provide one or more streams of air via the one or more air nozzles 414 to clean the interior panel 208 of the receptacle access point 104, such as the one or more receptacles 206 (e.g., prior to coupling with the one or more plugs 402 of the end effector 308). This improves the likelihood that the third image data will be useful (e.g., by reducing the likelihood that the one or more receptacles 206 are obfuscated or blocked by debris in the interior panel 208).

The third image data may include one or more images. The one or more images may be greyscale images. For example, the third image data may include greyscale image data. In other examples, other types of images may be included in the third image data. For example, the vision system 502 and/or the one or more controllers 328 may use greyscale image data to improve the efficiency of identifying the location and/or position of the one or more receptacles 206 (e.g., because analyzing or processing greyscale image data may consume fewer processing resources and/or computing resources as compared to processing other types of image data, such as point cloud data). For example, the vision system 502 and/or the one or more controllers 328 may use point cloud data to identify the location and/or position of the receptacle access point 104, the access door 202, and/or the access mechanism 204, among other examples, because information associated with the 3D environment in which these components are included may be useful to enable the robotic system 306 to engage with and/or otherwise interact with these components safely and efficiently. However, because the one or more receptacles 206 are included in a relatively controlled environment within the receptacle access point 104, the vision system 502 and/or the one or more controllers 328 may use greyscale image data to reduce the complexity and/or conserve resources associated with identifying the location and/or position of the one or more receptacles 206.

As shown by reference number 528, the vision system 502 (e.g., the second camera system 318) may provide or transmit, and the one or more controllers 328 may obtain or receive, the third image data. As shown by reference number 530, the one or more controllers 328 may identify the one or more receptacles 206 using the third image data. For example, the one or more controllers 328 identify, based on the third image data, a location of one or more receptacles

206 included in the receptacle access point 104. For example, the one or more controllers 328 may perform one or more image processing operations to identify or determine locations of respective receptacles 206. The one or more image processing operations may include edge detection, feature extraction, and/or pattern recognition, among other examples.

As shown by reference number 532, the one or more controllers 328 may provide, and the robotic system 306 may obtain, third instructions. The third instructions may cause the robotic system 306 to engage with the one or more receptacles 206 to enable energy transfer with (e.g., to or from) the work machine 100. The third instructions may indicate the locations of respective receptacles 206. The one or more controllers 328 provides (e.g., via the third instructions) receptacle locations (e.g., of the one or more receptacles 206) to the guidance system of the robotic system 306.

As shown by reference number 534, the robotic system 306 may engage with the one or more receptacles 206 to enable energy transfer. The energy transfer system 300 may perform, via the robotic system 306 and based on the indicated location(s) of the one or more receptacles 206, an action associated with enabling a coupling between the end effector 308 and the one or more receptacles 206. The robotic system 306 may cause, based on or using the indicated location(s) of the one or more receptacles 206, the end effector 308 to couple with the one or more receptacles 206 to enable an energy transfer to or from the work machine 100. The robotic system 306 may cause the one or more plugs 402 to engage with or couple with respective receptacles 206. The energy transfer system 300 may perform an energy transfer operation with the work machine 100 based on the coupling of the one or more plugs 402 with the one or more receptacles 206.

In some examples, one or more components depicted and described in FIGS. 5A-5B (e.g., the one or more controllers 328, the vision system 502, the first camera system 316, the second camera system 318, and/or the robotic system 306) may include a bus, one or more processors, memory, an input component, an output component, and/or a communication component.

The bus may include one or more components that enable wired and/or wireless communication among the components of a component. The bus may couple together two or more components, such as via operative coupling, communicative coupling, electronic coupling, and/or electric coupling. For example, the bus may include an electrical connection (e.g., a wire, a trace, and/or a lead) and/or a wireless bus. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may include one or more processors capable of being programmed to perform one or more operations or processes described elsewhere herein. The memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may include internal memory (e.g., RAM, ROM, or a hard disk drive) and/or removable memory (e.g., removable via a universal serial bus connection). The memory may be a non-transitory computer-readable medium. The memory may store information, one or more instructions, and/or software (e.g., one or more software applications) related to the operation of a component (e.g., the one or more controllers 328, the vision system 502, the first camera system 316, the second camera system 318, and/or the robotic system 306). The memory may include one or more memories that are coupled (e.g., communicatively coupled) to one or more processors, such as via the bus. Communicative coupling between a processor and memory may enable the processor to read and/or process information stored in the memory and/or to store information in the memory.

The input component may enable the component to receive input, such as user input and/or sensed input. For example, the input component may include a touch screen, a keyboard, a keypad, a mouse, a button, a microphone, a switch, a sensor, a global positioning system sensor, an accelerometer, a gyroscope, and/or an actuator. The output component may enable the component to provide output, such as via a display, a speaker, and/or a light-emitting diode. The communication component may enable the component to communicate with other devices via a wired connection and/or a wireless connection. For example, the communication component may include a receiver, a transmitter, a transceiver, a modem, a network interface card, and/or an antenna.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

The component (e.g., the one or more controllers 328, the vision system 502, the first camera system 316, the second camera system 318, and/or the robotic system 306) may perform one or more operations or processes described herein. For example, a non-transitory computer-readable medium (e.g., memory) may store a set of instructions (e.g., one or more instructions or code) for execution by the one or more processors. The processor(s) may execute the set of instructions to perform one or more operations or processes described herein. Execution of the set of instructions, by one or more processors, causes the one or more processors and/or the component to perform one or more operations or processes described herein. Hardwired circuitry may be used instead of or in combination with the instructions to perform one or more operations or processes described herein. Additionally, or alternatively, the processor(s) may be configured to perform one or more operations or processes described herein. Thus, implementations described herein are not limited to any specific combination of hardware circuitry and software.

As indicated above, FIGS. 5A-5B are provided as an example. Other examples may differ from what is described in connection with FIGS. 5A-5B.

FIG. 6 is a flowchart of an example process 600 associated with a vision system for an energy transfer system. One or more process blocks of FIG. 6 may be performed by a system (e.g., the energy transfer system 300 and/or the vision system 502). Additionally, or alternatively, one or more process blocks of FIG. 6 may be performed by another device or a group of devices separate from or including the system, such as another device or component that is internal or external to the energy transfer system 300.

As shown in FIG. 6, process 600 may include detecting that an energy transfer operation for a work machine is to be initiated (block 610). For example, the system may detect that an energy transfer operation for a work machine is to be initiated, as described above.

As further shown in FIG. 6, process 600 may include obtaining, via a first camera system, first image data associated with the work machine based on detecting that the energy transfer operation is to be initiated (block 620). For example, the system may obtain, via a first camera system, first image data associated with the work machine based on detecting that the energy transfer operation is to be initiated, as described above.

As further shown in FIG. 6, process 600 may include identifying, based on the first image data, a first location of a receptacle access point on the work machine (block 630). For example, the system may identify, based on the first image data, a first location of a receptacle access point on the work machine, as described above.

As further shown in FIG. 6, process 600 may include detecting that an end effector of a robotic system is in a ready position relative to the receptacle access point (block 640). For example, the system may detect that an end effector of a robotic system is in a ready position relative to the receptacle access point, as described above. The ready position is associated with a distance between the end effector and the receptacle access point satisfying a threshold. In some implementations, detecting that the end effector is in the ready position includes detecting that the end effector has completed a cleaning operation to clean the receptacle access point.

As further shown in FIG. 6, process 600 may include obtaining, via a second camera system, second image data associated with the receptacle access point based on detecting that the end effector is in the ready position (block 650). For example, the system may obtain, via a second camera system, second image data associated with the receptacle access point based on detecting that the end effector is in the ready position, as described above. In some implementations, the first camera system has a first field of view and the second camera system has a second field of view, where the first field of view is larger than the second field of view. In some implementations, alone or in combination with one or more of the first through fifth implementations, the first camera system and the second camera system are three-dimensional camera systems (e.g., stereo camera systems).

As further shown in FIG. 6, process 600 may include identifying, based on the second image data, a second location associated with the receptacle access point (block 660). For example, the system may identify, based on the second image data, a second location associated with the receptacle access point, as described above. In some implementations, the second image data may be the second image data and/or the third image data described in connection with FIGS. 5A-5B.

As further shown in FIG. 6, process 600 may include performing, via the robotic system, an action based on the second location (block 670). For example, the system may perform, via the robotic system, an action based on the second location, as described above.

In some implementations, the second location is a location of one or more receptacles included in the receptacle access point (e.g., where the second image data is the third image data described in connection with FIGS. 5A-5B), and performing the action includes causing, using the second location, the end effector to couple with the one or more receptacles to enable an energy transfer to the work machine.

In some implementations, the second location is a location of an access mechanism of the receptacle access point (e.g., where the second image data is the second image data described in connection with FIGS. 5A-5B), and performing the action includes causing, using the second location, the end effector to engage the access mechanism to access the receptacle access point.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

The disclosed energy transfer system may be used to enable an energy transfer to and/or from a receptacle access point of a work machine (e.g., without any interaction with a human technician). Because the autonomous energy transfer system does not require interaction with a human technician, a safety of a work site (e.g., that is associated with an industry, such as mining, construction, farming, or transportation) is enhanced (e.g., by removing a need for the human technician, a risk of accident or injury to any human associated with enabling an energy transfer is reduced or eliminated).

As described elsewhere herein, automated and/or autonomous processes utilize image data to ensure precise functionality. Typically, system may obtain image data at various points throughout the one or more automated and/or autonomous operations (e.g., as components and/or objects in an environment move). This may decrease the efficiency of the one or more automated and/or autonomous operations because there may be a delay associated with capturing, obtaining, and/or analyzing the image data at the various points. Additionally, an machine, such as a work machine, may operate in environments associated with harsh conditions (e.g., extreme temperatures, high wind speeds, a large amount of debris, and/or other harsh conditions), such as a mine site and/or other work sites. As a result, an automated and/or autonomous processes for energy transfer to the machine in the manner described above (e.g., capturing, obtaining, and/or analyzing the image data at various points in an energy transfer operation) may increase the risk of damage to one or more components of the system due to the components operating in and/or being exposed to the harsh environment for more time.

The vision system (e.g., the vision system 502) described herein enables improved efficiency and safety for the energy transfer operation via the energy transfer system. For example, by using separate camera systems (e.g., the first camera system 316 and the second camera system 318), the vision system is enabled to analyze a status of an external environment prior to causing the robotic system to enter the external environment (e.g., by using the first camera system that is externally mounted on the housing of the robotic system). This reduces a likelihood of damage to one or more components of the robotic system because the amount of time that the robotic system is operating in the external environment (e.g., that may have harsh conditions) is reduced and/or the robotic system may not exit the housing until the energy transfer system has determined that the external environment is safe (e.g., that are no unexpected objects or obstacles in the area in which the robotic system will operate) and that the work machine (e.g., the receptacle access point) is in a position to enable the energy transfer operation to be performed. This improves the efficiency of the energy transfer operation.

Additionally, by using the second camera system (e.g., mounted on the end effector of the robotic system) to capture image data of one or more components to be engaged with via the end effector, the vision system may enable improved location and/or orientation determinations of the one or more components to be engaged with via the end effector (e.g., the receptacle access point, the access mechanism, and/or the one or more receptacles, among other examples described herein). For example, the image data captured by the first camera system may enable the energy transfer system to determine that it is safe for the robotic system to exit the housing and to determine a location of the receptacle access point on the work machine. The energy transfer system may use the image data captured by the first camera system to position the end effector in the ready position near the receptacle access point. The energy transfer system may then use the second camera system to capture and/or obtain more detailed and/or more precise information for the one or more components to be engaged with via the end effector. This improves the efficiency of the energy transfer operation because energy transfer system may use the image data captured by the first camera system to position the end effector in the ready position near the receptacle access point before attempting to determine the more detailed and/or more precise information via the image data captured by the second camera system.

In this way, the energy transfer system enables an energy transfer to (or from) the work machine (e.g., to or from an energy storage system of the work machine). An energy transfer to the energy storage system of the work machine may cause the energy storage system to be replenished. Further, because the energy transfer system uses multiple camera systems and precision controlled systems, the energy transfer system facilitates an accurate coupling of the one or more plugs of the end effector and the one or more receptacles of the receptacle access point. This increase the likelihood of an optimal replenishment of the energy storage system of the work machine, such as in terms of decreasing an amount of time needed to replenish the energy storage system and in terms of enabling an increased replenishment level of the energy storage system (e.g., at, or near, a maximum replenishment level of the energy storage system). Optimal replenishment improves a performance of the work machine, such as by increasing an amount of time that the work machine is available to perform powered operations (e.g., as compared to an amount of time that the work machine needs to be replenished) and by increasing an amount of power that is available to perform the powered operations. Optimal replenishment of the electric machine also prevents, or minimizes a likelihood of, degradation of the energy storage system of the work machine, which improves a performance and/or operable life of the energy storage system, and the work machine.

What is claimed is:

1. An energy transfer system, comprising:
a robotic system that includes an end effector for coupling with receptacles for energy transfer;
a first camera system;
a second camera system; and
one or more controllers configured to:
  detect that an energy transfer operation for a work machine is to be initiated;
  obtain, via the first camera system and based on detecting that the energy transfer operation is to be initiated, first image data associated with the work machine;
  identify, based on the first image data, a first location of a receptacle access point on the work machine;
  detect that the end effector is in a ready position relative to the receptacle access point;
  obtain, via the second camera system and based on detecting that the end effector is in the ready position, second image data associated with the receptacle access point;
  identify, based on the second image data, a second location of one or more receptacles included in the receptacle access point; and
  perform, via the robotic system and based on the second location, an action associated with enabling a coupling between the end effector and the one or more receptacles, the action including at least opening an access door of the receptacle access point.

2. The energy transfer system of claim 1, wherein the one or more controllers, to detect that the energy transfer operation for the work machine is to be initiated, are configured to:
detect that the work machine is located in a position relative to the energy transfer system, wherein the position is associated with initiating the energy transfer operation.

3. The energy transfer system of claim 1, wherein the one or more controllers are further configured to:
obtain, via the second camera system and based on detecting that the end effector is in the ready position, third image data associated with an access mechanism of the receptacle access point; and
identify, based on the third image data, a third location of the access mechanism.

4. The energy transfer system of claim 3, wherein the one or more controllers, to obtain the second image data, are configured to:
detect that the robotic system has accessed the receptacle access point via the access mechanism; and
obtain, via the second camera system, the second image data based on the robotic system accessing the receptacle access point.

5. The energy transfer system of claim 3, wherein the first image data and the second image data include point cloud data, and
wherein the second image data includes greyscale image data.

6. The energy transfer system of claim 1, wherein the first camera system and the second camera system are stereo camera systems.

7. The energy transfer system of claim 1, wherein the energy transfer system further comprises a housing in which the robotic system is moveably configured, and
wherein the first camera system is mounted on an exterior of the housing.

8. The energy transfer system of claim 1, wherein the second camera system is mounted on the end effector.

9. A method, comprising:
detecting, by a device, that an energy transfer operation for a work machine is to be initiated;
obtaining, by the device and via a first camera system, first image data associated with the work machine based on detecting that the energy transfer operation is to be initiated;
identifying, by the device and based on the first image data, a first location of a receptacle access point on the work machine;
detecting, by the device, that an end effector of a robotic system is in a ready position relative to the receptacle access point;
obtaining, by the device and via a second camera system, second image data associated with the receptacle access point based on detecting that the end effector is in the ready position;
identifying, by the device and based on the second image data, a second location associated with the receptacle access point; and
performing, by the device and via the robotic system, an action based on the second location,
wherein detecting that the end effector is in the ready position comprises:
  detecting that the end effector has completed a cleaning operation to clean the receptacle access point.

10. The method of claim 9, wherein the ready position is associated with a distance between the end effector and the receptacle access point satisfying a threshold.

11. The method of claim 9, wherein the first camera system has a first field of view and the second camera system has a second field of view,
wherein the first field of view is larger than the second field of view.

12. The method of claim 9, wherein the second location is a location of one or more receptacles included in the receptacle access point; and
wherein performing the action comprises:
  causing, using the second location, the end effector to couple with the one or more receptacles to enable an energy transfer to the work machine.

13. The method of claim 9, wherein the second location is a location of an access mechanism of the receptacle access point; and
wherein performing the action comprises:
  causing, using the second location, the end effector to engage the access mechanism to access the receptacle access point.

14. The method of claim 9, wherein the first camera system and the second camera system are three-dimensional camera systems.

15. A vision system of an energy transfer system, comprising:
a first camera system having a first field of view, the first camera system being configured to:
  obtain first image data indicative of receptacle access point locations for energy transfer;
a second camera system having a second field of view, the second camera system being coupled to a robotic system of the energy transfer system, and the second camera system being configured to:

obtain second image data indicative of receptacle locations, the second image data being associated with coupling an end effector of the robotic system with one or more receptors for the energy transfer; and one or more controllers configured to:

provide the receptacle access point locations and the receptacle locations to a guidance system of the robotic system.

16. The vision system of claim 15, wherein the energy transfer system includes a housing for the robotic system, and wherein the first camera system is mounted to an exterior of the housing.

17. The vision system of claim 15, wherein the first image data includes point cloud data representative of the receptacle access point locations, and wherein the second image data includes one or more images depicting the receptacle locations.

18. The vision system of claim 15, wherein the energy transfer system includes a housing for the robotic system, wherein the first camera system, to obtain the first image data, is configured to:

obtain the first image data while the robotic system is inside of the housing; and wherein the second camera system, to obtain the second image data, is configured to:

obtain the second image data while the robotic system is outside of the housing.

* * * * *